US006862083B1

United States Patent
McConnell, Sr. et al.

(10) Patent No.: US 6,862,083 B1
(45) Date of Patent: Mar. 1, 2005

(54) SYSTEM AND METHOD FOR ACCURATELY CHARACTERIZING AND MAPPING AGRICULTURAL PLANTS AND FOLIAGE

(76) Inventors: Robert E. McConnell, Sr., 1003 Muirfield Ct., Oviedo, FL (US) 32765; Robert A. Hoppenfeld, 2015 Legacy Palms Dr., Maitland, FL (US) 32751; Matthew G. Taylor, 340 Spring Rum Cir., Longwood, FL (US) 32779

( * ) Notice: Subject to any disclaimer, the term of this patent is extended or adjusted under 35 U.S.C. 154(b) by 128 days.

(21) Appl. No.: 10/025,374

(22) Filed: Dec. 19, 2001

Related U.S. Application Data (60) Provisional application No. 60/256,716, filed on Dec. 19, 2000.

(51) Int. Cl.[7] ................................................ G01C 3/08
(52) U.S. Cl. ........................................ 356/4.01; 47/1.7
(58) Field of Search ............................. 359/4.01; 47/1.7

(56) References Cited

U.S. PATENT DOCUMENTS 5,278,423 A * 1/1994 Wangler et al. ................ 47/1.7
5,896,190 A * 4/1999 Wangler et al. ............ 356/4.01

* cited by examiner

*Primary Examiner*—Mark Hellner
(74) *Attorney, Agent, or Firm*—Allen, Dyer, Doppelt, Milbrath & Gilchrist, P.A.

(57) ABSTRACT

A lazer rangefinder employs time-of-flight measurements for providing high resolution when measuring range and intensity in a system for accurately mapping and classifying agriculture foliage. Profiles and parameters of the foliage and trees are measured and calculated for classifying the tree, controlling mechanical devices for applying only a pre-selected amount of treatment materials to the tree, and estimating production yeilds. Using a global positioning receiver, a global location for the center of each tree, whether fully grown, juvenile, or dead is identified and used in mapping the measured trees.

15 Claims, 4 Drawing Sheets

SYSTEM AND METHOD FOR ACCURATELY CHARACTERIZING AND MAPPING AGRICULTURAL PLANTS AND FOLIAGE

CROSS REFERENCE TO RELATED APPLICATION

This application claims priority to Provisional Patent Application having Ser. No. 60/256,716 for "Agricultural Mapping and Classification System and Method" filed on Dec. 19, 2000, commonly owned, the disclosure of which is herein incorporated by reference.

FIELD OF THE INVENTION

The invention generally relates to sensing and physically characterizing objects such as agricultural plants for controlling the application of fertilizers, insecticides, herbicides, and the like, and more particularly to the use of a laser rangefinder for accurately characterizing and mapping the agricultural plants that are typically found in citrus groves and the like.

BACKGROUND OF THE INVENTION

The sensing of agricultural crops including tree foliage for controlling the amount of chemicals to be applied is well known to improve upon the economics of care as well minimizing the adverse impact on the environment. As described in the U.S. Pat. No. 4,823,268 to Giles et al., issued in 1989, tremendous strides have been made in agricultural production. However, the ever-increasing cost of chemical materials, such as fertilizers, insecticides, herbicides, and the like, as well as the constraints from government authorities regarding their use, has prompted considerable research with a goal of improving the efficiency of agricultural material application.

In an orange grove or orchard, for example, knowledge of the size and shape of a target area based on an actual measurement is most desirable for the application of the chemical materials. Sensing devices have been developed using ultrasonic technology as described in the Giles '268 patent referred to above. In addition, sensing systems have employed a plurality of sensors, as described in U.S. Pat. No. 4,768,713 to Roper, for actuating a plurality of spray nozzles used to distribute the wet chemical materials to be applied. However, improved accuracy in the measurement of various shapes can be achieved by using the narrow beam available with a laser rangefinder, as described in U.S. Pat. No. 5,278,423 to Wangler, et al., which discloses a continuously scanning pulsed laser radar beam from a single rangefinder sensor operable with a mobile agricultural sprayer that moves between trees in a grove or orchard to determine the foliage on the tree to be targeted and estimates a tree height based on the highest pulse returned, the disclosure of which is herein incorporated by reference. By way of example, the Wangler '423 sensor allows zone-controlled spraying while optimizing water and chemical usage thus minimizing soil and ground water pollution. Only a pre-selected amount of spray, determined to be necessary to cover the foliage, is dispensed by the sprayer, thus eliminating wasted spray above and between crops. Desirably, an eye-safe laser is used for accurately detecting the presence and extent of foliage on each side of the agricultural sprayer for automatically activating the sprayer controls to limit spraying only to the foliage. There is also a need for such accuracy in determining characteristics such as the center of the tree, the density of the foliage within the target, foliage volume with the canopy of the tree, density of the canopy, and the like for locating and characterizing the tree within the plurality of trees being treated. Combining this information with other inputs, a grower will be able to make more timely and accurate estimates of crop production. Further, there is a need to map agricultural fields without the high dependency on weather conditions and the high cost of aerial photography.

SUMMARY OF THE INVENTION

In view of the foregoing background and identified needs, it is therefore an object of the present invention to provide a system and method for accurately measuring selected physical parameters of an object in order to characterize that object. For example, one object of the present invention is to characterize a tree for controlling the application of materials to the tree and its surroundings, and for mapping the presence of the tree within its environment. It is yet further an object to provide a measuring accuracy sufficient to support tree characterization including the identification of a dead tree, defoliated tree, and the like. It is yet another object to provide a system and method of characterizing crops that could be used on a variety of vehicles including an agricultural sprayer, tractor, truck, or the like.

A sensor employed in the system of the present invention includes a laser rangefinder interfaced with a computer and digital storage. By way of example, the system herein described includes a portable computer with a hard disk drive and re-writeable memory. A scanner is integrated with a relay module to control devices of the application vehicle, such as valves on an air-blast sprayer as earlier described. For ground vehicles as herein described, the system includes a wheel sensor for tracking vehicle movement. For use in mapping, the system is operable with a Global Positioning System (GPS) receiver. For mapping and tree characterization functions, the vehicle and scanner move through a grove while the system scans, calculates, and records data for each tree of interest in a database in order to construct maps of descriptive data.

One method aspect of the invention includes controlling an application of selected treatment materials to a selected area of target trees by a vehicle, the method comprising scanning an optical beam in a predetermined pattern about a tree for measuring a plurality of ranges from a sensor operable with a vehicle useful in distributing the selected treatment materials, measuring range and intensity of reflected beams from the tree for a plurality of locations sufficient for determining multiple parameters for the tree including a center of the tree, tree height, tree width, and tree foliage volume, measuring a distance traveled for the sensor, and providing a control signal to the vehicle for distributing the selected treatment materials based on at least one of the parameters.

Another method aspect of the invention includes classifying a tree, the method comprising scanning an optical beam in a predetermined pattern across a tree for measuring a plurality of ranges from a plurality of locations thereabout, measuring range and intensity of returned optical beams reflected from the tree for the plurality of locations, wherein the returned optical beams are sufficient for determining multiple parameters selected from the group consisting of tree height, tree width, and tree foliage volume, selecting at least one measured parameter from the group for providing a measured tree description, and comparing the measured tree description to a predetermined tree description based on the at least one measured parameter for classifying the tree as belonging to a tree group.

Appreciating that other than the scanning of an optical beam, alternate sources of pulses, such as ultrasonic as described in U.S. Pat. No. 4,823,268 to Giles et al., the disclosure of which is herein incorporated by reference, may be employed in the methods herein described given the teachings of the present invention. As a result, yet another method aspect of the invention includes measuring an object for evaluation thereof, the method comprising delivering an emitted pulse onto an object, measuring a return pulse from the object, recording at least one of an intensity of the return pulse and a range to the object determined by the return pulse, and repeating the recording for a plurality of locations on the object sufficient for providing a description thereof, wherein the description includes a volume of the object, a width of the object, a height of the object, and a center of the object.

In further describing embodiments of the present invention, various measurements are made to provide the information needed to support proper control of materials distribution and mapping. The center of each tree is located from system measurements for providing the latitude and longitude of the center of trees of interest. A global location is calculated based on a GPS signal, a wheel sensor and a real time clock. The center of the tree is determined based on the range and intensity readings from the sensor measurements as a pulsed laser beam is scanned across a tree. By way of example for one measurement, if a tree is determined to have a spheroidal shaped canopy and is separate from adjacent trees, then the center will be directly measured at the center point between both edges. Attention is also given to trees having other than spheroidal shapes, and trees having little or no foliage. The volume inside the canopy surface of the tree is calculated by numerical integration of the range for each laser pulse fired at the tree. The calculation of foliage density is a relative measurement of the amount of foliage per canopy volume. A tree is divided into a larger grid set of numbers of laser pulses. A grid area within each set is assigned the median intensity of the laser pulses inside that grid. These median intensities are averaged over the entire grid structure and thus the tree. At very close range, intensity of the return pulse may be higher because of reduced laser spot size on a target. A range measurement is used to eliminate effects due to very close range targets. It is expected that modifications will be made to a resulting measurement based on a predetermined effect from ambient sunlight level, leaf condition, leaf orientation throughout the day, cleanliness, presence of oil, water, dust, wind, fog, and the like. Tree height is calculated based on the highest pulse received and the shape of the tree canopy as measured using the range data. If a tree is determined to be sufficiently spheroid in shape, the surface of the tree is mathematically modeled and the maximum height determined from that model. If a tree is determined to be a non-spheroidal shape, the height will be estimated as a percentage above the highest position sensed. A tree will be classified based on pre-selected criteria. The system of the present invention will recognize trees within certain ranges of values of combined height, canopy volume, and density, and will characterize them as dead, juvenile (non-producing) or normal, by way of example. The tree classes can be established by scanning sample trees from each pre-selected class or they can be based on data values input by a user. Tree widths are calculated based on the range and intensity mapping across a tree. By way of example, if a tree is determined to be spheroidal in shape and separate from adjacent trees, then the width of that tree will be determined directly from the distance between the start and finish edges of the tree. If a tree is determined to be touching an adjacent tree, laser beam intensity readings from a return pulse reflected are used in conjunction with surface shape to determine where two trees intersect. That intersection is established and stored as the tree width. An elevation will be determined from a GPS signal and a real-time clock.

BRIEF DESCRIPTION OF THE DRAWINGS

Embodiments of the invention are described by way of example with reference to the accompanying drawings in which.

DETAILED DESCRIPTION OF THE INVENTION

The present invention will now be described more fully hereinafter with reference to the accompanying drawings, in which embodiments of the present invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
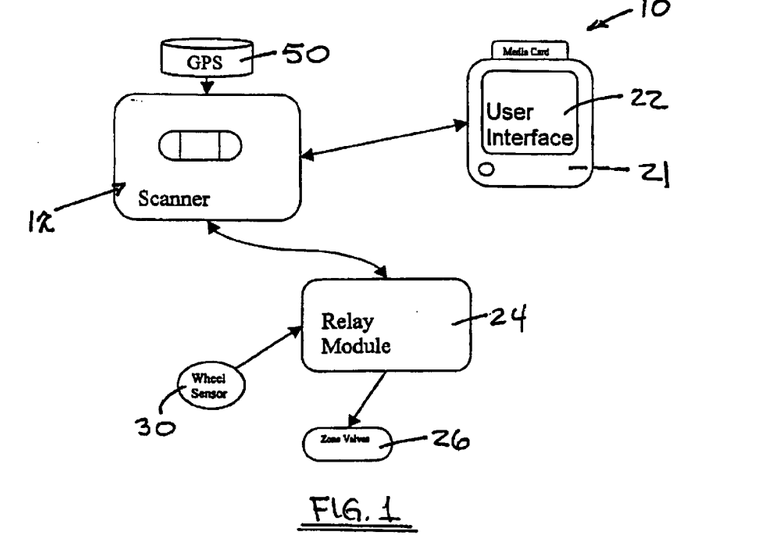
FIG. 1 is a system block diagram illustrating an embodiment of the present invention including a system for accurately characterizing and mapping agricultural plants and foliage.
Figure 2:
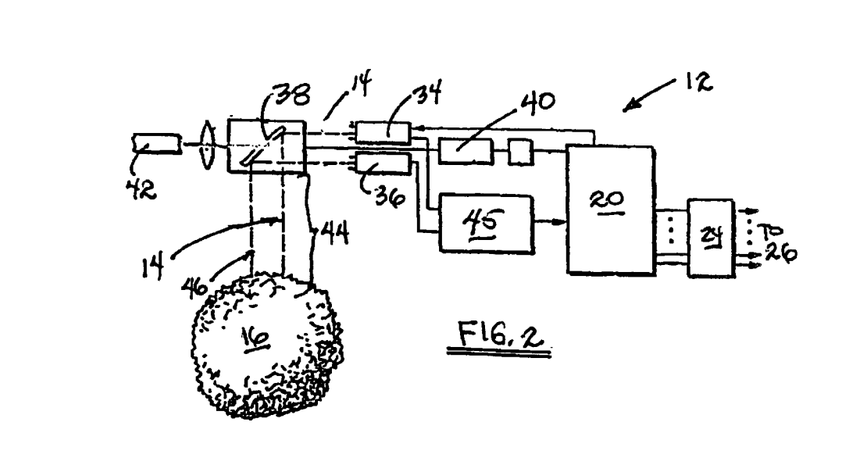
FIG. 2 is a block diagram of a laser rangefinder sensor useful with the system of FIG. 1.
Figure 3:
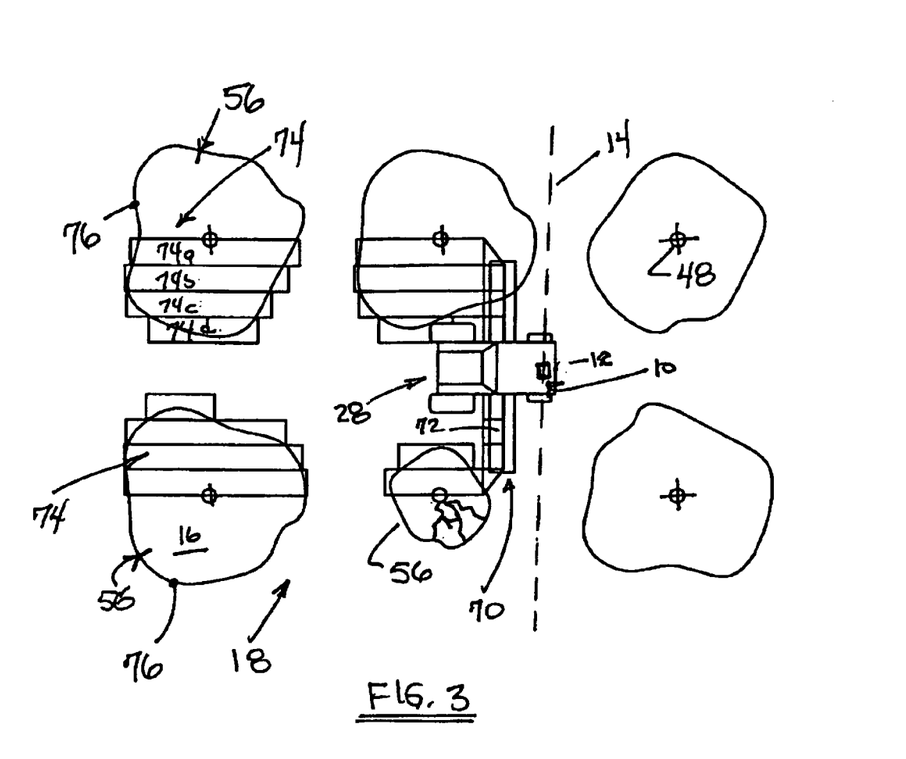
FIG. 3 is a top plan view illustrating one use of the present invention with a dry chemical spreader employing the system of FIG. 1 to determine ground locations appropriate for spreading materials.

With reference initially to FIG. 1, a system 10 useful in characterizing and mapping agricultural plants and foliage includes a sensor 12 which scans a pulsed laser beam 14 onto each tree 16 within a grove 18, as illustrated with reference to FIGS. 2 and 3, by way of example, for measuring a range or distance to various features of the tree. As herein described for a preferred embodiment of the sensor 12, a laser rangefinder is operable with a microprocessor 20 for its control, which sensor is operable with a computer 21 having a user interface 22, and available data storage which may be integrally packaged if desired. By way of example, the system 10 herein described includes a portable computer with a hard disk drive and re-writeable memory. The scanning sensor/scanner 12 is integrated with a relay module 24 to control material distribution devices 26 of an application vehicle 28, such as valves on an air-blast sprayer as earlier described or the dry chemical tractor styled vehicle illustrated with reference again to FIG. 3. For the ground vehicle 28 as herein described, the system 10 includes a wheel sensor 30 for tracking vehicle travel. For use in mapping, the system 10 is operable with a Global Positioning System (GPS) receiver 32. For mapping and tree characterization functions, the vehicle 28 and scanner 12 move through the grove 18 while the system scans, calculates, and records data for each tree 16 of interest in a database in order to construct maps of descriptive data.

With reference again to FIG. 2, and as described in U.S. Pat. No. 5,896,190, one preferred embodiment of the sensor/scanner 12 is of the pulsed time-of-flight range measuring type. A laser transmitter 34 and optical receiver 36 having a common field of view are continuously scanned. The embodiment described in the '190 patent uses a mirror 38 rotating within a vertical plane, which plane is perpendicular to the direction of travel of the vehicle 28 upon which the sensor 12 is carried. The mirror position is tracked using a shaft encoder 40 operable with a mirror drive motor 42. This permits a single sensor 12 to be used in the making of multiple range measurements between the sensor 12 and the tree 16 on both sides of the vehicle 28 traveling between rows of trees within the grove 18. As controlled by the microprocessor 20 and range measurement circuitry 45, the sensor 12 will determine a range 44 from measured times for emitted laser beam pulses 14 to leave the transmitter 34 and return as reflected beam pulses 46 to be detected by the receiver 36. The scanning beam and vehicle travel provide accurate three-dimensional images for use in controlling the application of materials. Typically, the scanning of the pencil-like laser beam will be at a rate providing range measurements and surface detection accuracies having generally high resolutions well above other measurement devices typically used in the art. By way of example, the resolution will allow detection and measurement of tree branches, useful in classifying trees.

By programming the computer 21 and providing user friendly commands at the user interface 22, a plurality of measurements can be made form the time-of-flight range data collected as the pulsed laser beam is scanned across the trees of interest. By way of example, consider those parameters useful in controlling the applications of materials such as fertilizers, insecticides, herbicides and the like, in addition to those parameters useful in mapping a grove and estimating a production yield therefrom.

The global location of the center 48 of a tree, as illustrated by way of example for a grove with reference again to FIG. 3, is useful in mapping and in tree care. The global location is calculated based on signals from a GPS 50, the wheel sensor 30, and real-time from a real time clock, which herein can be from the GPS or the computer. The center 48 of the tree is determined based on the range readings and intensity readings 49 across the tree 16, as illustrated with reference to FIG. 4 for trees 16a, 16b, and 16c. If one tree 16b is determined to have a spheroidal shape and is separated from adjacent trees 16a, 16c, then its center 48b will be directly measured at the center point between opposing longitudinal edges 52, 54. If the tree is determined to be non-spheroidal, it will be treated differently. The laser return intensity readings 49 are used in conjunction with the surface shape to determine where the edges 52d, 54d and center 48c, 48d of the tree canopy 56 are located. The intensity 49 may be higher or lower at the edges or center of the tree. The system 10 compares intensity values to the shape to determine whether a maximum or minimum intensity corresponds to the center, and then determines the center location based on this maximum or minimum.

The present invention includes determining the center of a tree for mapping that tree within an area map using longitude and latitude data. Consider laser pulses that go through the tree without bouncing off any limbs or leaves. Because the foliage within the canopy 56 of a tree 16 is generally porous, some of the pulses will go through the tree. However a tree trunk is generally solid and opaque with respect to the laser beam, thus all laser pulses will bounce off. The tree is mathematically divided into a grid as will herein be described by way of example.

An N-order moving average is used in the calculations, with $$F(t+1)=1/N(A_t+A_{t-1}+ \ldots A_{t-n+1})$$

where N is the number of prior periods to include in the moving average; Aj is the actual value at point j; and Fj is the forecasted value at point j. A moving average provides trend information that a simple average of all historical data would mask.

Step 1: Finding the center of mass before tree combinations.

Method one for locating the trunk includes:
  a. Find the vertical plane with the least amount of "pass through" returns of the scanning pulsed laser beams.
  b. Create an N order moving average and find minimum "pass through" points.
  c. This will be the established trunk location (Alternatively, this step may be completed using standard deviation methods depending on implementation).

Method two includes determining the "thickest part of the half":
  a. Pass a horizontal slice read from a grid of values through an N order moving average.
  b. Find the maximum value of that horizontal slice and record its location in a vertical slice.
  c. Repeat for all slices located in the grid. The end result will look something like the grid of Table 1 below. The vertical slice is the location, value pair shown in bold numbers.

TABLE 1

| grid defining a tree | | | |
|---|---|---|---|
| 1 | 2 | 3 | 1 |
| 2 | 12 | 4 | 2 |
| 3 | 7 | 9 | 0 |
| 0 | 5 | 6 | 0 | d. Pass a vertical slice read from a grid of values through an N order moving average to find the peak location pair. The graph of Table 2 below shows the final location, value pair. Note that most of the time it will not be a value recorded but one derived from the data.

TABLE 2

| grid defining a tree | | | |
|---|---|---|---|
| X | x | 3 | x |
| X | • 12 | x | x |
| X | x | 9 | x |
| X | x | 6 | x |

Using a 2 order moving average
• Location = (3, 2.6)
Value = 10.5

Using a 2-order moving average, Location=(3,2,6) and a Value=10.5
  e. That will be established as the thickest part of the tree, and thus its center.

Method three for finding the center of mass of the tree:
  a. Find Primary Guess 1. Do Method two above using range data from the laser rangefinder
2. The "thickest part of the half" can then be located
b. Find Secondary Guess
1. Use Method one above
2. This will provide the trunk location
c. Find the Third Guess
1. Use Method two above using intensity data from the laser rangefinder
2. This will provide information for a good center of vegetation
d. Center of mass is the following equation
UC1=Unknown Coefficient 1
UC2=Unknown Coefficient 2
CMASS=AVE [Primary Guess, (UC1*Secondary Guess), (UC2*Third Guess)]

If one of the three guesses does not provide sufficient data for determining "good" results, as predefined by the user, it is eliminated from the average.

A list of threshold limits and the deviation between other guesses will define a good guess. Only one guess is needed to finish successfully Step 2: Combining multiple instances after data has been collected. By way of example, the front of the tree is scanned once, the back of the tree twice and a side of the tree once. All of these data files are combined into one data file. If more than one scan of a tree exists the following formula is used to find the center of mass:

CMASS=AVE [CMASS1 (front), CMASS2 (back 1) . . . CMASSX (side)]

Step 3: To find the location of the tree, use the center of mass and eliminate a height variable.

The system of the present invention will calculate a global position for each tree using the wheel sensor for some distance should the GPS signal fail for some period of time. An alarm tells the operator when the GPS signal is no longer acquiring from the satellites. A second alarm tells the operator when the calculated position data are no longer reliable.

The volume inside the canopy surface of the tree is calculated using a numerical integration of the range for each laser pulse fired at the tree. Reference is made to the disclosure of Tumbo, Et. Al, Laser, Ultrasonic and Manual Measurements of Citrus Tree Canopy Volume, ASAE 01-011068, Jul. 30, 2001, herein incorporated by reference. Determining the volume of a tree canopy is useful both for mapping and spraying sections of the tree.

Figure 5:
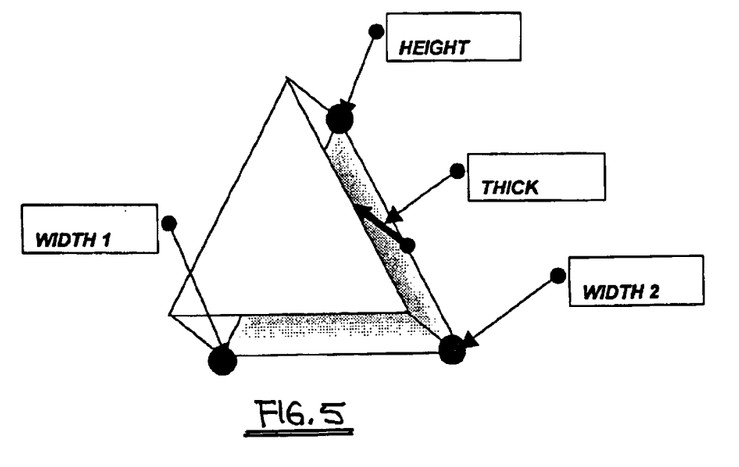
FIG. 5 is a pictorial representation of parameters used in the system of FIG. 1.

Consider the following definitions herein used in calculating tree canopy volume: a "back plane" is an arbitrary point behind the surface scans of the tree half; and a "tree half volume" is the sum of all in tree ranges to the back plane. As illustrated with reference to FIG. 5, a "four point plane system" includes the following definitions: THICK is a measure of thickness of a tree from the back plane at a back plane location; WIDTH 1 is a width of one side of the tree at the bottom location; WIDTH 2 is width at another side of the tree at the bottom location; and HEIGHT is the height of the tree at the center location. A Volume Offset is a calculated number that uses the four-point plane system to mimic volume. It is derived from an actual tree half volume so that the polygon yields the correct volume. With these in mind, consider a first step for finding the volume of the half tree with:

a. The back plane as the back tree limit.
b. For every point in the tree grid that is in the tree range:
  1. Add the volume from the current point to the back plane to the volume variable.
  2. Keep track of the number of points
  3. Keep track of the maximum range point
  4. Keep track of minimum Range Point
c. Volume=Volume−(Maximum Range Point Δ Current Back Plane)*Number of points
d. Back Plane=Maximum Range Point
e. THICK=Minimum Range Point Δ Maximum Range Point
f. Fill in HEIGHT, WIDTH 1, and WIDTH 2 variables
g. Volume Offset=Ratio of Volume to Polygon Volume A second step to be considered will include combining Tree Halves. There may be one or more tree half scans, for example Front, Side, and Back Scans. Consider the following conditions:

Condition 1: If only half of the tree is scanned.
a. Increase or decrease the current thickness to match tree location variable.
b. Double the new thickness
c. Find the new volume of the polygon
d. You now have the tree volume Condition 2: If multiple tree halves are combined
a. Increase or decrease the current thickness of each polygon to match tree location variable.
b. Find the average volume offset for all polygons.
c. Using Polygon combination to combine all polygons.
d. Use the average volume offset to yield the true volume.

Foliage density is a relative measurement of the amount of foliage per canopy volume. This is measured by mathematically dividing the tree into a larger grid of set numbers of laser pulses. Each grid point or alternatively each area within the grid is assigned the median intensity of the laser pulses inside that grid area. These median intensities are averaged over the entire tree or grid structure. At very close range, intensity of the return may be higher because of reduced laser spot size on a target. As a result, a range measurement is used to bias intensity values and eliminate effects due to very close range targets. Modifications can be made to the measured results based on factors affecting the repeatability of this measurement such as ambient sunlight level, leaf condition, leaf orientation throughout the day, cleanliness, presence of oil; water; dust, wind, fog, and the like.

Therefore, to measure a foliage density, in keeping with the teaching of the present invention, define the tree canopy by a grid structure including a preselected number of grid areas forming the tree structure. Increasing the number of grid areas within the structure will increase the resolution. For each grid area having a returned-reflected pulse, determine a medium intensity for that grid area. Sum the medium intensities and sum the number of grid areas receiving any return pulse, the ratio determining an average intensity for the entire grid structure and thus the tree. Optionally, this average intensity is modified by a foliage density coefficient determined empirically to thus provide a foliage density.

In determining tree volume, the following definitions are used:

Density Coefficient=the average density of a tree
This data is provided in the configuration data. The reason for this is that the density of an orange tree may be different from the density of an apple tree.

Tree Volume=Volume of the tree as determined from the Tree Volume Algorithm

Tree Space Volume—A cylinder with the following characteristics:

Height=Height to the tree
Diameter=Tree Width

Now determine an actual/true density as a ratio of the tree volume to the tree space volume using the formula:

Density=Density Coefficient*(Tree Volume/Tree Space Volume)

Tree height 58 is calculated based on the highest pulse 14h received and the shape of the tree canopy 56 as measured using the range data. If the tree 16 is determined to be sufficiently spheroidal in shape, as illustrated with reference to FIG. 6, the surface 60 of the tree is mathematically modeled and the maximum height determined from that model. If the tree is determined to be non-spheroid, the height will be estimated as a percentage above the highest position sensed.

For use in the example herein described, consider definitions for:

Noise Filter=A method of reducing the amount of bad values

Maze Filter=A filter to reduce orphan data.

In this case a high point will be found and will act as the start.

Figure 6:
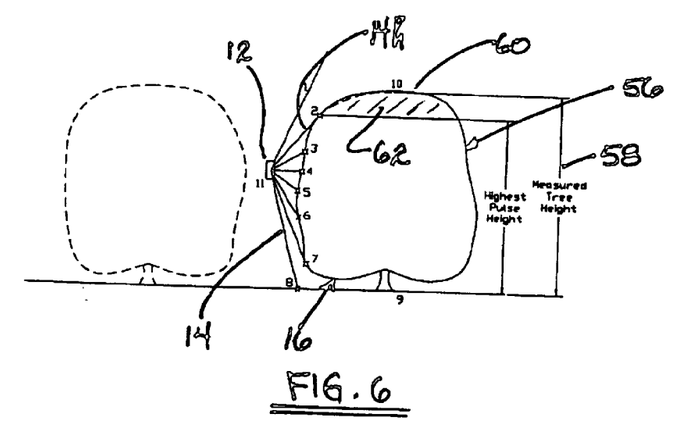
FIG. 6 illustrates the use of multiple scanned beams when determining tree height.

Orphan data=data that is considered valid but is not connected to the primary portion of data One method includes the following steps including isolating a top pre-selected percentage 62 of the tree 16:

a. Given a scan of a tree data would be passed through a filter to reduce the amount of noise and other bad data.

b. 3% or 10 vertical scans, whichever is greater, at the center of the scan grid will be used to get a rough estimate of the top of the tree.
  1. The top at this point will be determined by point of data that would be in the tree range at the highest point.

c. Given current highest point take 5% of the horizontal scans below the high point and all the horizontal rows above the scan. This is not needed to finish successfully but does reduce the amount of time needed to process the data.

Continuing, with the top preselected percentage 62 of the tree 16, find the high point using Maze analysis as follows:

a. Given the top pre-selected percentage of a scan grid. Start from the top row and look for the first high point. A high point would be a value that is in the tree range and that has the point directly below it in range.

b. Use a maze filter to try and find the bottom of the scan or to the point of ground level.

c. If the point is an orphan then look for the next high point not in the orphan group and repeat step b.

d. If no valid high point has been found use the first high point found.

e. The returned result is the preliminary top of the tree.

Finally, finding the actual height will include the following:

a. Actual height will be an unknown percentage gain of the maximum height. This will be dependent on the actual height of the tree and its actual volume.

b. The returned height will be actual height−ground height

Alternatively, a method may include the following for finding the high point of the tree.

a. Start from the top row and look for the first high point. A high point would be a value that is in the tree range and that has the point directly below it in range.

b. Using 10% of the vertical column directly below the high point. If 95% of the values are within the tree range then the point is the high point. If not continue with step a.

c. The returned height will be high point−ground height.

With the earlier described parameters available to a user, trees can be classified. The system is able to "recognize" trees within certain ranges of values of combined height, canopy volume and density and characterize them as dead, juvenile (non-producing) or normal as desired by a user. The system can be "trained" to recognize a tree class by scanning designated sample trees for each class, or alternatively classification can be based on values input by the user.

With reference again to FIG. 4, a tree width 62 is calculated based on the range and intensity 49 across the tree 16. As earlier described, if the tree 16a is determined to be spheroidal in shape and separate from adjacent trees, then the width will be directly measured by the distance between the start and finish edges of the tree. If a tree is determined to be touching an adjacent tree it is treated differently. The laser return intensity readings are used in conjunction with the surface shape to determine where two trees intersect. That intersection is stored as the tree width, a useful value for both mapping and controlling material distribution such as spraying.

Figure 4:
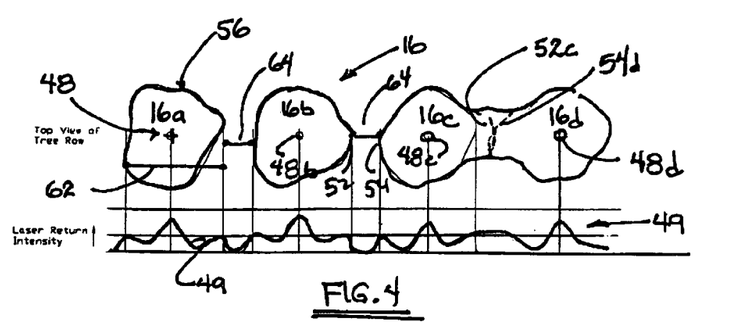
FIG. 4 is an illustration of laser beam intensity for reflected scanned beams for distances traveled by the sensor during the scanning of designated trees.

Consider a measurement method herein described by way of example to include the following steps for finding gaps 64 between the trees 16.

Finding the Beginning 52 of a tree 16b
  a. Constant scans "look" for an "80% no tree" indication on a vertical scan
  b. If X scans have been less than "80% no tree," then the beginning of the tree is the current scan−X scans Finding the End 54 of the tree 16b.
  a. Constant scans "look" for an "80% no tree" on a vertical scan
  b. If Y scans have been less than the "80% no tree," then the end of the tree is the current scan−Y scans
  c. If current scan is greater than 1.5 times the predefined width of a tree then switch to the hedgerow with analysis algorithm.

With a hedgerow analysis and as illustrated with reference to FIG. 4 for trees 16c, 16d, the tree width is a predefined tree width. However there are several factors that can provide for correction. Each correction factor is applied independently and has an undefined correction coefficient.

Factor 1: Center of mass—using the center of mass calculation find the center of mass.

Factor 2: Bubbling of tree growth height—using the tree height formula, as earlier described, to "guess" where the top of the tree is.

The following formula is applied:

Location of tree=(The End of the last tree)+0.5*(Tree Width)+ (Factor 1*unknown coefficient)+(Factor 2*unknown coefficient)

End of tree=Location of tree−0.5*(Tree Width)

Beginning of tree=Location of tree+0.5*(Tree Width)

A tree elevation is determined from the GPS signal and real-time dock. Ground level is a useful reference variable. Consider the following slope formula: $y=mx+b$, where m is the slope and b is the intercept. One measurement employed by the present invention includes determining a slope using a "least squares" method. By way of example, using the "least squares" method to calculate a straight line that best fits the data, the equation for the line is: $y=mx+b$ or $y=m_1x_1+m_2x_2+ \ldots +b$ (if there are multiple ranges of x-values), where the dependent y-value is a function of the independent x-values. The m-values are coefficients corresponding to each x-value, and b is a constant value. Note that y, x, and m can be vectors.

Alternatively, the slope can be found using a linear regression technique with the slope being the vertical distance divided by the horizontal distance between any two points on the line, which is the rate of change along the regression line.

The equation for the slope of the regression line is:

$$b = \frac{n\Sigma xy - (\Sigma x)(\Sigma y)}{n\Sigma x^2 - (\Sigma x)^2}$$

As a result, a ground level adjustment for a tree on a hill, by way of example, can be accurately measured. Consider the following creation of a slope formula for the ground level:
  a. Given a grid of data for a tree scan;
  b. Average the bottom 5% of horizontal slices to form one vertical data set;
  c. Find the slope using the "least squares" method or by using linear regression analysis; and
  d. That final slope formula will be used to calculate ground level.

As a result, a slope formula will be used instead of a fixed number adjustment to account for the situation of trees on a hill or a bank. Consider the following situation by way of example: Given: Y=0.5X+1

1: A 10-foot tree 5 feet from the unit
Actual height when ground level is taken into account:

$Y=0.5*5+1 \rightarrow Y=3.5$ feet 10 foot tree–3.5 feet of ground=6.5 foot tree 2: A 10-foot tree 10 feet from the unit $Y=0.5*10+1 \rightarrow Y=6$ feet 10 foot tree–6 feet from ground=4 foot tree Additional parameters will also be determined. By way of example, time can be based on the GPS signal and a real-time clock.

Growers value this information because it enables them to spot problem areas in their groves, evaluate the effects of different chemical applications, and perform trend analysis over the course of a season or several years. The database file resulting from the above-described data acquisition using the system and methods of the present invention can be graphed and analyzed using commercially available computer software, such as "ArcView" by ESRI Corp.

Figure 7:
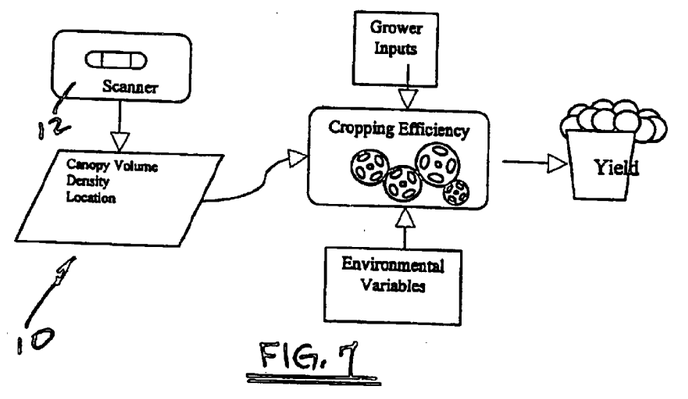
FIG. 7 is a block diagram illustrating a function of the system of FIG. 1.

It is also useful for grove managers to estimate the amount of fruit to be harvested, or yield, for a given area of land. There is a correlation between canopy volume, foliage density and fruit yield, enabling growers who are using the present invention to assess their crops' yield earlier in the season and more accurately than traditional methods. Currently, total canopy volume can be estimated using statistical sampling techniques, but this is labor intensive and subject to error because it is based on a limited number or measurements. As illustrated with reference to FIG. 7, using commercially available software, the analyst can sum the tree canopy volumes and foliage densities over the entire area of interest—one acre, a multi-acre block, an entire grove or a group of groves. These data can then be used as an input to estimate yield for the area of interest. The grower will obtain more accurate yield estimates by combining the scanner data with environmental variables such as the amount of sunshine and rain in the remainder of the growing season as well as grower-controlled inputs like the amount of fertilizer, soil type, fruit and rootstock variety, and the like.

By way of further example, liquid sprayers and dry chemical spreaders may now be used to apply chemicals to the ground instead of directly to the tree, as is typical for grove applications. A grove may have a variety of tree classes such as a fully developed tree 16, as illustrated again with reference to FIG. 3, or a juvenile tree 66, as described earlier, and they may be distributed randomly throughout the grove. It may be desirable to apply different chemicals or different amounts of chemicals to the different classes of trees based on measured zones 68.

The following Table 3 of application rules is one example of the classes and chemicals applied:

TABLE 3

| Tree Class | Fertilizer Application | Herbicide Application |
|---|---|---|
| Normal | Full Rate | None |
| Juvenile | Half Rate | Full Rate |
| Dead | None | Full Rate |

For liquid sprayers, this is accomplished in a manner as described in the above referenced '423 U.S. patent wherein the liquid sprayer may be configured with a set of valves controlling flow from one or more chemical tanks to nozzle manifolds. The system 10 classifies a tree 16, 66 as it moves past it. The valves are opened or closed by the scanner system based on the application rules and tree classification. For dry chemical spreaders 70 as illustrated again with reference to FIG. 3, this is accomplished using actuators that control the flow of material to the distribution mechanism 72. A liquid sprayer is configured with a set of valves controlling flow from one or more chemical tanks to nozzle manifolds that are in different locations away from the sprayer. The valves are opened or closed by the scanner system based on the shape of the tree canopy 56 such that chemical is applied to the ground only within applicable zones 74, and in this example, only within the circumference of a dripline 76 defined by the projection of the canopy onto the ground. The dripline is generally the outside edge of the tree projected straight down to the ground, illustrated with reference again to FIG. 3. It may be desirable to only apply certain chemicals to the ground and only under the canopy of the tree, within the dripline 76. Using laser range data, the system measures the shape of the tree canopy 56 as earlier described and a mathematical projection onto the ground determined for use in defining the area of interest within the dripline 76 where material is to be delivered.

As a result, the dry chemical spreader mechanism 70 may be controlled to apply material precisely under each tree as such tree is classified. The spreader would be configured with a delivery mechanism that allows for more precise application location similar to a commercially available drop spreader.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

That which is claimed is:

1. A method of controlling an application of selected treatment materials to a selected area of target vegetation by a vehicle, the method comprising:
  scanning an optical beam in a predetermined pattern about a vegetation for measuring a plurality of ranges from a sensor operable with a vehicle useful in distributing the selected treatment materials;

measuring range and intensity of reflected beams from the vegetation for a plurality of locations sufficient for determining multiple parameters for the vegetation including a center of the vegetation, vegetation height, vegetation width, and vegetation foliage volume;

measuring a distance traveled for the sensor; and providing a control signal to the vehicle for distributing the selected treatment materials based on at least one of the parameters.

2. A method according to claim 1, wherein the scanning is provided by a pulsed laser beam emitted from a rotating reflecting surface.

3. A method according to claim 1, wherein determining the center of the vegetation comprises:

representing the vegetation by a grid structure having multiple areas; and determining one area within the grid structure wherein the one area includes a minimum amount of non-return values of the reflected beams when compared to the areas within the grid structure.

4. A method according to claim 1, wherein determining the center of the vegetation comprises:

representing the vegetation by a grid structure having multiple areas; and determining one area within the grid structure wherein the one area represents a closest range to the sensor when compared to the areas within the grid structure.

5. A method according to claim 1, wherein determining the center of the vegetation comprises:

representing the vegetation by a grid structure having multiple areas; and determining one area within the grid structure wherein the one area represents a maximum height measurement of the vegetation when compared to the areas within the grid structure.

6. A method according to claim 1, wherein determining the center of the vegetation comprises:

representing the vegetation by a grid structure having multiple areas; and determining a first area within the grid structure wherein the first area includes a minimum amount of non-return values of the reflected beams when compared to the areas within the grid structure;

determining a second area within the grid structure wherein the second area represents a closest range to the sensor when compared to the areas within the grid structure;

determining a third area within the grid structure wherein the one area represents a maximum height measurement of the vegetation when compared to the areas within the grid structure; and combining at least two of the first, second, and third areas for determining the center of the vegetation.

7. A method according to claim 1, further comprising a mapping of multiple vegetations using measured distances between the centers of each vegetation within the multiple vegetations.

8. A method according to claim 7, further comprising a global positioning of the vegetations using a signal from a global positioning device.

9. A method according to claim 1, wherein determining the vegetation foliage volume comprises:

representing the vegetation by a grid structure including multiple grid areas;

assigning each grid area a median intensity value measured from all laser pulses received within the grid area; and averaging the median intensities over the entire grid structure.

10. A method according to claim 1, further comprising determining foliage density comprising:

representing the vegetation by a grid structure including multiple grid areas forming the grid structure;

assigning each grid area a median intensity value measured from all pulses received within the grid structure; and providing a ratio of a sum of the median intensities from all grid areas and a sum of all grid areas having received a pulse therein.

11. A method according to claim 10, further comprising modifying the foliage density by a foliage density coefficient empirically determined from physical measurements.

12. A method according to claim 1, wherein determining vegetation height comprises:

measuring a range for a highest laser beam returned for the reflected beams; and modifying results of the measuring based on a measured shape of the vegetation at an uppermost portion thereof using a percentage change of a maximum height measurement across the canopy of the vegetation.

13. A method according to claim 1, wherein determining vegetation width comprises using range and intensity data for defining edges of a canopy of the vegetation when a gap exists between adjacent vegetations.

14. A method according to claim 1, wherein determining vegetation width comprises determining a center of mass for the vegetation, the height of the vegetation, and the intensity of returned laser pulses to determine a vegetation edge when the vegetation is within a hedgerow.

15. A method according to claim 1, further comprising classifying a vegetation based on at least one of the parameters, wherein the vegetation is classified as being one from a group consisting of a producing vegetation, a juvenile vegetation, and a dead vegetation.

* * * * *